United States Patent [19]

Friederichs et al.

[11] Patent Number: 4,693,665
[45] Date of Patent: Sep. 15, 1987

[54] LARGE FORCE MULTI-AXIS MANIPULATING ARM UNIT, ESPECIALLY FOR USE AS AN INDUSTRIAL ROBOT

[75] Inventors: Karl-Heinz Friederichs, Kiel; Günther Twiefel, Flintbek, both of Fed. Rep. of Germany

[73] Assignee: Blohm & Voss AG, Hamburg, Fed. Rep. of Germany

[21] Appl. No.: 598,519

[22] Filed: Apr. 9, 1984

[30] Foreign Application Priority Data

Apr. 9, 1983 [DE]  Fed. Rep. of Germany ....... 3312862

[51] Int. Cl.$^4$ .............................................. B25J 9/06
[52] U.S. Cl. .................................. 414/744 R; 901/20; 901/28; 188/72.4
[58] Field of Search ....................... 901/19, 20, 22, 28; 414/730, 749, 744 R, 744 A, 732; 188/71.1, 72.1, 72.4, 151 R, 366; 192/109 A, 88 A

[56] References Cited

U.S. PATENT DOCUMENTS

| | | | |
|---|---|---|---|
| 2,257,610 | 9/1941 | Kraft | 192/2 |
| 3,166,167 | 1/1965 | Kinsman | 188/72.4 |
| 3,330,391 | 7/1967 | Mamo | 188/72.4 |
| 3,995,723 | 12/1976 | Holcomb, Jr. | 188/72.4 |
| 4,239,431 | 12/1980 | Davini | 901/15 X |
| 4,339,984 | 7/1980 | Hühne | 901/20 X |
| 4,441,854 | 4/1984 | Di Matteo et al. | 901/49 X |
| 4,442,929 | 4/1984 | Uchida | 188/72.4 X |

FOREIGN PATENT DOCUMENTS

| | | |
|---|---|---|
| 0109252 | 5/1984 | European Pat. Off. . |
| 1293500 | 4/1969 | Fed. Rep. of Germany . |
| 2840341 | 4/1979 | Fed. Rep. of Germany . |
| 2912262 | 10/1980 | Fed. Rep. of Germany ........ 901/20 |
| 3151752 | 8/1982 | Fed. Rep. of Germany . |
| 1088200 | 10/1967 | United Kingdom ............... 188/72.4 |
| 1455782 | 11/1976 | United Kingdom .................. 901/19 |

Primary Examiner—Robert J. Spar
Assistant Examiner—Donald W. Underwood
Attorney, Agent, or Firm—Nils H. Ljungman

[57] ABSTRACT

A freely programmable multi-axis articulated manipulating arm unit having arm elements disposed along different longitudinal axes especially for use as an industrial robot is provided with a drive system and a brake system for each of individual rotational or translational axes; the drive systems belonging to the rotational or translational axes of the manipulating arm unit are each provided with a hydraulically actuated locking brake which functions in a play-free manner, when in the operating braking state. Each of these brakes fixes adjacent arm-elements with respect to each other. Said adjacent arm elements are able to move about the rotational axes relative to each other when the said brakes are not operative. The arm elements are fixed directly in every position, that is, without the use of intermediate elements.

16 Claims, 4 Drawing Figures

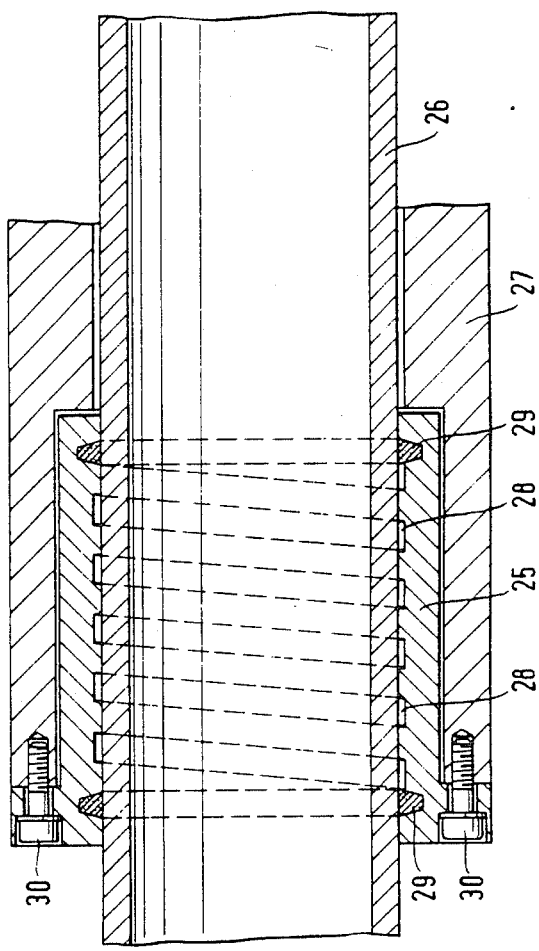

LARGE FORCE MULTI-AXIS MANIPULATING ARM UNIT, ESPECIALLY FOR USE AS AN INDUSTRIAL ROBOT

BACKGROUND OF THE INVENTION

1. Field of the Invention

The invention relates to a freely programmable multi-axial manipulating unit having an articulated arm, especially an industrial robot, in which each of the joints of the articulated arm-members which are disposed along different individual axes is provided with a drive system and a braking means.

With known types of industrial robots of the type described above, braking means are invariably provided at the joints in order to hold the articulated arm members in desired relative positions.

2. Description of the Prior Art

With the prior art types of industrial robots (IR's), the brakes provided are merely constructed in the form of holding brakes in order to prevent sinking of the articulated arms which would occur as the result of intrinsic weight of its elements in the event of a power failure. Owing to the nature of their function, these brakes need to have only a relatively small braking torque and since, with such function, there is no demand for precision. There is also no need to build these brakes with inherent precision such as to be free of play.

OBJECTIVES OF THE INVENTION

There is thus, with industrial robots, the requirement to arrest the movement of the articulated arm in all the rotational axes of the robot arm and hence lock the robot arm so positively and strongly that the arm can handle large forces often generated external thereto, for example, when inserting a tool. Whereas the holding brakes in known robotic arms are not in a position to fulfill these requirements, for the aforementioned reasons, the present invention fulfills the object of providing an industrial robot whose stiffness or rigidity is not impaired by the limitations of the prior art axial joints or pivots.

SUMMARY OF THE INVENTION

The invention in one of its broad forms resides in a freely programmable multi-axial manipulating arm unit in the form of an articulated industrial robot arm having a plurality of arm elements at least some of which are disposed along different but connected axes. The individual axes are each provided with a drive system in the form of an actuator and a braking device. The drive systems associated with the axes of the manipulating arm unit are each provided with a hydraulically operated locking brake which operates free of play. Each of these brakes, when in the operated state, fixes the adjacent arm elements with respect to each other. Each brake has means which allows the arm elements to move axially relative to each other when the brakes are not operated. The rigid fixing is effected directly and without intermediate elements.

The invention in another of its broad forms resides in a multi-axis manipulator arm unit which comprises an articulated robotic arm for performing a task, said arm having a plurality of adjacent arm elements at least two of which are disposed along independent axes connected at at least one joint, the robotic arm including a drive system at said at least one joint, each said drive system including an actuator for causing relative movement between at least a first and a second adjacent arm element and a braking device for arresting relative movement between said first and said second adjacent arm elements, an improvement comprising: a hydraulically operated locking brake at said at least one joint for locking said adjacent arm elements firmly with each other, said locking brake having first and second locking friction surfaces in opposition, said first and second friction surfaces being supported respectively by said first and second adjacent arm elements; and means to force said first and second friction surfaces in use, into frictional contact with each other so as to lock said first and second adjacent arm elements, whereby the manipulator arm achieves increased stiffness at said at least one joint so that said task can be performed with stability.

The invention in yet another of its broad forms resides in a multi-axis manipulating arm unit which comprises an articulated robot arm, said arm having a plurality of adjacent arm elements at least some of which are disposed along different axes connected at at least one joint, one of said at least one joints being provided with a drive system including an actuator and a braking device, said actuator at said one joint being connected to cause controlled relative movement between adjacent arm elements at said joint, said braking device being disposed to selectively stop relative movement between said adjacent arm elements, the improvement comprising: a hydraulically operated locking brake, said one joint for selectively locking said adjacent arm elements with each other, said locking brake having a substantially circular caliper plate supported by a first of said adjacent arm elements, said caliper plate having a surface which is opposite a mating surface which is supported by the other of said adjacent arm elements; and a hydraulic actuator means connected to actuate said caliper plate to frictionally engage said mating surface, whereby, in use, said adjacent arm elements can be lock-braked to increase arm stiffness at said one joint so to facilitate performing said task with stability that a substantial force is transmitted by said robot arm, in use, through said one joint.

The invention in a further of its embodiments resides in a multi-axis manipulating arm unit in the form of an articulated industrial robot arm having a high force generating means for generating a high force about one axis of said multi-axis unit; said robot arm having a plurality of arm elements, at least two adjacent arm elements which are disposed along different but connected longitudinal axes, said at least two arm elements are connected at a joint; said joint having a drive system comprising an actuator for providing movement about an axis of said joint and a locking braking device for preventing movement at said joint; said drive system is provided with a high braking force hydraulically operated locking brake having means for hydraulically applying said high braking force during braking operation; and means for holding said applying means substantially free of play and for locking said at least two arm elements substantially rigidly with respect to one another thereby transmitting large forces which exceed many times the forces or torques required to lock said plurality of arm elements substantially rigidly against the force of gravity, from one arm of said two adjacent arm elements being operatively connected to said high force generating means, to the other of said two adjacent arm elements; said braking device including means for said adjacent arm elements to move substantially freely relative to each other when the brake is not applied whereby the locking of the braking of the locking brake is effected directly.

The invention in a still further embodiment resides in a multi-axis manipulating arm unit with at least one high force motor for moving at least a portion of said manipulator arm unit which unit comprises an articulated robot arm, said arm having a plurality of adjacent arm elements at least two of which are disposed along different axes connected at at least one joint, said joint being provided with a drive system including an actuator and a braking device, said actuator at said joint being connected to cause controlled relative movement between said adjacent arm elements at said joint, said braking device being disposed to selectively stop relative movement between said adjacent arm elements; a hydraulically operated locking brake at said joint for selectively locking said adjacent arm elements with each other, said locking brake having a substantially circular disc plate supported by a first of said adjacent arm elements, a circular braking element supported by the other of said adjacent arm elements, at least a portion of said circular braking element being axially flexible, said disc plate having a surface which is opposite a mating surface of said circular braking element; and a hydraulic actuator means connected to actuate said braking element to flex it axially and to engage it frictionally with said mating surface, whereby, in use, said adjacent arm elements can be lock-braked to increase arm stiffness at said one joint so that a substantial force is transmitted by said robot arm, in use, through said one joint.

The invention in a yet further embodiment resides in a multi-axis manipulator arm unit with at least one high force motor for moving at least a portion of said manipulator arm unit which unit comprises an articulated robotic arm for performing a task, said arm having a plurality of adjacent arm elements at least two of which are disposed along independent longitudinal axes connected at a joint, the robotic arm including a drive system at said joint, said drive system including an actuator for causing relative movement between a first arm element and a second adjacent arm element and a braking device for arresting relative movement between said first and said second adjacent arm elements, said braking device being a hydraulically operated locking brake at said at least one joint for locking said adjacent arm elements firmly with respect to each other, said locking brake having facing first and second locking friction surfaces, said first and second friction surfaces being supported respectively by said first and second adjacent arm elements; and means to force said first and second friction surfaces in use, into frictional contact with each other so as to lock said first and second adjacent arm elements, whereby the manipulator arm achieves greatly increased stiffness at said at least one joint so that a large force generated by at least said one high force motor can be transferred through the articulated robotic arm with said articulated robotic arm maintaining a stable relationship between the adjacent arm elements.

A preferred embodiment described herein illustrates an arrangement wherein the drive systems for the rotational axes of the manipulating arm unit are each provided with a hydraulically actuated play-free locking brake. Each of the locking brakes, when in operation, relatively fixes (with respect to each other) the arm elements which, otherwise, i.e., when the brakes are not braking, can move axially with respect to each other. The fixing of the arm with respect to one another is effected directly, that is, without intermediate elements.

In the described embodiment of the invention, the drive system for the arm portions along the axes of the manipulating arm unit are each provided, in addition to the locking brake, with a hydraulically released spring operated holding brake.

Additional embodiments of the invention are to be understood from the description which follows.

BRIEF DESCRIPTION OF THE DRAWINGS

The invention will now be described by way of example in the following on the basis of the appended drawings in which:

FIG. 4 shows a holding brake with a pressure body which takes the form of a play-free elastic element.

DESCRIPTION OF PREFERRED EMBODIMENTS

Figure 1:
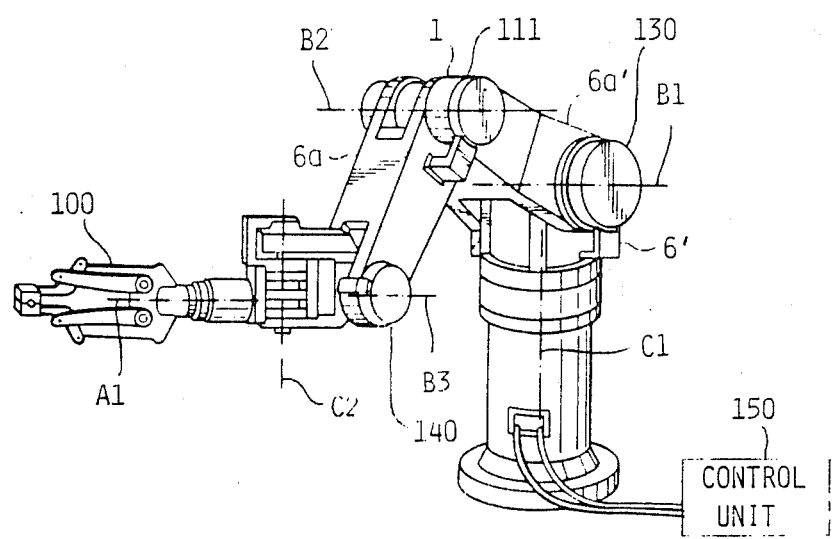
FIG. 1 shows an industrial robot, designated hereinafter generally by the reference character IR, with rotational axes designated by C1, B1, B2, B3, C2 and A1. The IR arm portions disposed along different axes are of modular construction and are connected together at the separation points. Each drive-shaft end of the IR-axes is provided with a locking brake.

FIG. 1 shows in perspective an IR in which the invention can be applied. For example, when the brakes, according to the invention, are activated into braking action, at and about the rotational axes, B1, B2, B3, C2 and A1, with, for example, elongated arms 6a and 6a', a very large torque generated about axis C1 by a high torque motor (not shown) within the base of the unit, can be transmitted to a manipulating device 100. Each of the axes preferably has a hydraulic motor 111, 130 and 140 associated therewith for generation of torques in addition to the brake, according to the invention. This brake, to be described in detail below, is typically connected to an arm 6a and a shaft 5 (shown in FIG. 2) of a motor 111 associated with the axis B2. Alternately, even some or all of the motors 111, 130 and 140 may be high torque motors which torque motors having torque generating capabilities substantially in excess of those torques required to move the arms of the IR against the forces of gravity acting thereon. The manipulating device 100, typically, does not only have to pick up an object and move or manipulate it, but either does or does not pick up an object and deliver a relatively large force therethrough which is far in excess of the gravitational forces acting on the articulated arm. A control unit 150 controls the movements and actions of the IR.

Preferably, at least some of the axes have motors mounted on both sides of the outer portion of their associated arms and even have two brakes, one on each side of each arm for wherein certain rotary joints are provided with a double shaft-end and two-sided power take-off and wherein said brakes are arranged to lie symmetrically on both sides. The arm 6a has a circular portion 120 covering the end of the motor 111.

Figure 2:
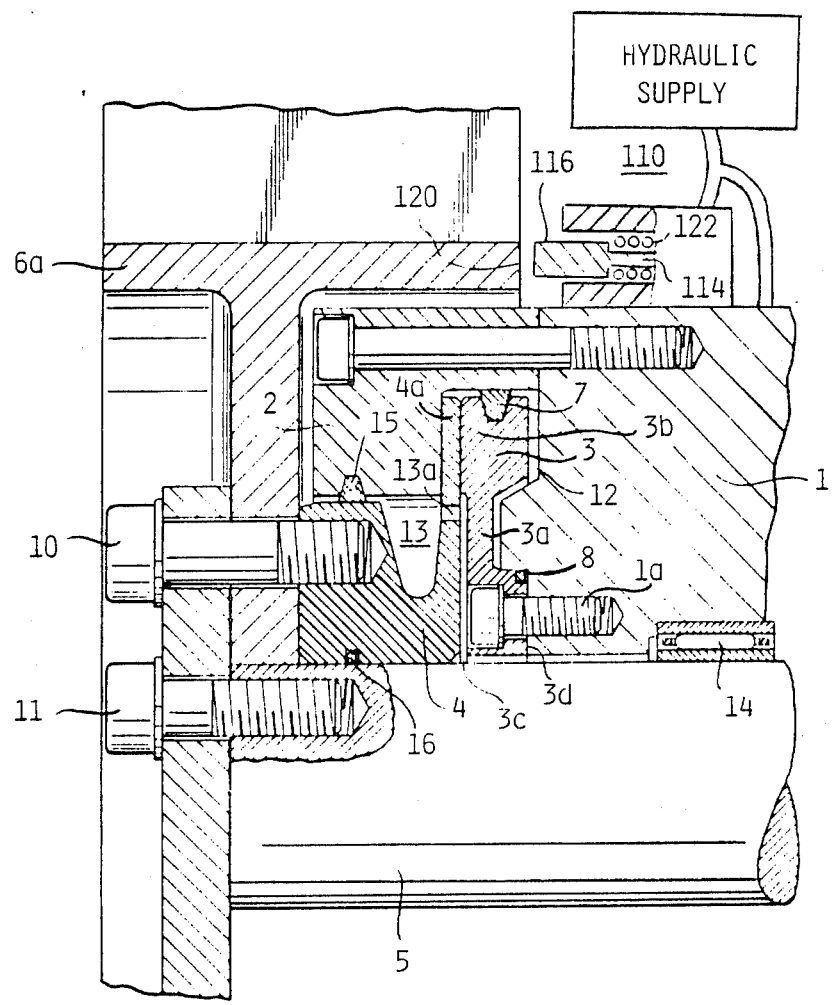
FIG. 2 shows a basic representation partially in section of the arrangement of a locking brake, constructed as a play-free disc brake.

FIG. 2 illustrates one of the embodiments of an arrangement of locking brakes in the IR. The locking brakes of FIG. 2 are applied after each positioning operation of the IR in which the plurality of the IR's axes become oriented as directed by the control unit 150 of FIG. 1. To this end, a pressure chamber 12, shown in FIG. 2, located behind a brake piston 3 for braking, is selectively acted upon by oil under pressure which is admitted via a hydraulic oil passage (not shown). The brake piston 3 is gripped at the inner edge 3d thereof and connected to the motor housing 1 by a plurality of bolts, only one of which is shown as 1a. The brake piston 3 is also sealed with respect to the housing by means of an O-ring 8 in order to prevent oil leakage. The outer edge 3b of brake piston 3 carries a dynamic seal 7 thereon which can be shifted in an axial direction with respect to a longitudinal axis of a shaft 5 against the brake pressure disc or plate 4 because the middle region 3a of the brake piston 3 is made thinner than other parts of the brake piston 3, and therefore, is elastic or resilient in order to permit the axial flexing thereof. However, the brake piston 3 is also made resistant to rotational distortion from compressional and other forces acting thereon. The outer portion 3b of the brake piston 3 is forced by an oil pressure increase in the pressure chamber 12, due to the elasticity of the middle region 3a, against the disc 4.

A control valve for applying hydraulic oil from a pressurized source through a hydraulic line to the pressure chamber 12 is well known in the art, as well as the other components connected thereto, and therefore, these components are not shown.

The brake piston 3 is provided with a friction surface on the contact face to the brake pressure disc 4. The braking torque transmitted to the brake piston 3 is braced, free of torsional and other play, with respect to the motor housing 1.

The brake pressure disc 4 is connected directly and in a play-free manner to the arm 6a with the aid of bolts two of which 10 and 11 are shown. When in the braked condition, the torques introduced by the arm are transmitted via the two friction faces of the brake pressure disc 4 and the brake caliper 2 to the brake piston 3 which finally braced, play-free, against the motor housing 1. The action of the outer portion 3b of brake piston 3 presses the outer portion 4a of the disc 4 against the brake caliper 2. In the unbraked state, some axial play or spaces exists between the friction faces of the brake caliper 2, the disc 4 and the brake piston 3. This play must be overcome during the braking process by the axial braking stroke of the brake piston 3 and the brake pressure disc 4, that is, the outer portions 3b and 4a, respectively of the brake piston 3 and the brake pressure disc 4 which are elastically flexed by the oil pressure and thus movable in the axial direction of the shaft 5. By this arrangement, it is possible to attain substantially, rotationally play-free transmission of the braking torque.

In order to achieve the greatest possible braking torque, the brake caliper 2 is made circular, e.g., annular, and the brake pressure disc 4 is loaded against it over its entire circumference with a very high surface pressure, which can be achieved advantageously by the hydraulic actuation of the outer portion 3b of the brake piston 3.

For cases where a controlled predetermined braking force is required while the axes are moving, there is the danger of seizure and/or scoring of the friction faces if proper control is not effected. In order to prevent this from occurring, mating brake surfaces are provided which do not stick to one another when the braking function is not activated and which also do not slip when the braking function is activated. These materials for the braking surfaces are called herein slip-stick-free. The brakes are thus expediently operated wet in an oil bath. Slip-stick-free materials per se are known in the art in applications such as clutches, and as such, it is considered superfluous to dwell extensively on slip-stick-free materials in the context of this invention. The oil bath space 13 ensures the wet operation of the brake. This oil space 13 may be connected to the overflow or leakage oil line (not shown), so that small amounts of leaked oil, which pass from the pressure chamber 12 via the dynamic seal 7 into the oil bath space 13, may be carried off into an overflow oil line if required when the braking function is actuated. Alternatively, some pressure relief for this oil could be provided by a dynamic oil seal or gasket 15.

A hole 13a connects the oil bath space 13 with a space 3c between the disc 4 and the brake piston 3 and allows for the passage of oil therebetween.

Expediently, some overflow oil is allowed to pass from the stationary part of the IR's axis (the motor housing 1) to a rotating part (motor shaft 5 and arm 6a). For this purpose, it is expedient to have a rotating hydraulic connection, if it is not desired to use a movable flexible hose. This rotating connection can be achieved advantageously via a rotating groove, which is essentially formed on account of the elastic construction of the brake pressure disc 4 and which, in accordance with the invention, forms a ring-channel of the rotating hydraulic connection. The oil-bath chamber 12 is substantially sealed-off with regard to the exterior by the dynamic seal 15 and an O-ring 16.

In the braked condition, the radial forces coming from an arm 6a are taken up by the friction-determined locking between the brake pressure disc 4 and the brake piston 3 and/or the brake caliper 2, so that the motor bearing 14 is not loaded. For very light braking, the brake piston 3 may only make contact with the brake pressure disc 4.

Control of the brake is, advantageously, effected by means of fast-switching hydraulic valves, especially pressure servo-valves, which, in association with the pressure chamber 12 having a volume which is kept small, and since the small axial movement or stroke of the outer portion 3b and the middle portion 3a of the brake piston 3, lead to short pressure rises and falls, and thus provides fast brake acting times. These short brake acting times serve to provide a more extensive use for the locking brake over and above the intrinsic locking by enabling it to transmit very substantial torques and forces.

Hydraulic valves of the pressure servo-valve type per se are known in the art; as such, the description herein does not dwell at length regarding the structure and operation of such valves. In order to ensure long wear and durability, the frictionally engaging braking portions of the disc brake 4 may be hardened. So also are the braking portions of caliper 2 and brake piston 3.

The elastic action of the middle region 3a of the brake piston 3 is also very fast, even upon release, because of the inherent elasticity and inherent restoring force thereof.

Preferably in addition to the brake as described above, a spring actuated holding brake 110 is shown which is mounted on the motor housing 1, which brake is held in a non-braking position by a hydraulic actuator 112 by the action of a piston (not shown) connected to a shaft 114 attached to a brake pad 116. When the hydraulic actuator 112 is de-energized, by the reduction of oil pressure therein, the brake pad 116 makes contact with the circular portion 120 of the arm 6a. A spring 122 forces the brake pad 116 against the portion 120 of the arm 6a thereby holding the motor housing 1 and the arm 6a in a locked relationship. Preferably, the hydraulic actuator 112 is connected to the same source of hydraulic pressure as the pressure chamber 12 so that a power failure and subsequent loss of hydraulic pressure will lock the elongated arms 6a and 6a' of the IR into position in order to avoid movement therebetween caused by the force of gravity thereon and also avoiding possible damage thereto.

In this embodiment, the motor housing 1 has a diameter which is smaller than the diameter of the circular portion 120 of the arm 6a, so that, the brake pad 116 can make contact with the circular portion 120.

During the positioning process or during a feed motion of the IR, it is desirable that the damping, which is normally small—especially with direct hydraulic drive systems—should be brought to an optimum value in order to arrive at better dynamic behavior and hence to shorter positioning times. The minimization of the oil volumes between and play of the components of the present invention aid in the achieving of improved damping.

With the aid of the stick-slip-free surfaces in the locking brakes, and by controlling these brakes in proportion to the travel-speed of the IR axis, it is possible to obtain frictional damping which is proportional to the speed.

Additionally, in the event of slow travel of the articulated arm into a required position, it is possible, by a sudden application of the locking brakes, to obtain an immediate stop in the required position. The effect is the result of the exceptionally high braking action of the locking brakes—the same as when a stop is slowly approached.

After the locking operation, hunting phenomenon which frequently occurs with position-controls, even in the positioned state, is substantially eliminated. The IR can be loaded to correspond to very high braking torques, which are typically substantially larger and a multiple of the torque of the drive motor, so that, on the basis of the play-free transfer of the braking torque, the external forces can be transmitted through a braking structure which corresponds to the mechanical stiffness of the IR structure. In the process of practicing the present invention, performance is obtained which is comparable to an unarticulated and continuous arm having arm members which are joined together without hinged or rotary joints.

Advantageously, the IR with the locking system is assembled in a building-block-like fashion, from axis modules and arm modules. To this end, the axis modules must be ready for use and thus come preferably completely equipped with the following functional elements: a housing with a axis drive system and a bearing, a position sensor or path measuring system, locking brakes, holding brakes which act in the event of a power failure, control units and/or valves for the axis drive system and the brakes, guides for the power and control lines between the joints of connection of the axis module, and any safety switch arrangements.

The axis modules must preferably be provided with connecting points for coupling additional axes or arm modules. By different combinations of the modules belonging to a total-IR, it is possible to arrive at a very large multiplicity of arrangements for a correspondingly large number of different applications.

Figure 3:
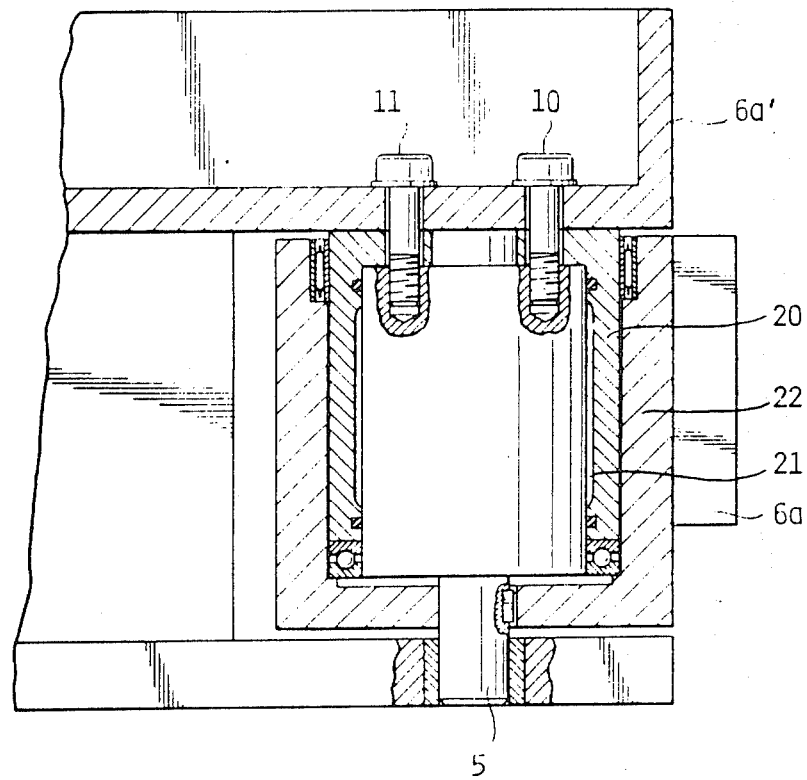
FIG. 3 shows a locking brake with a resilient sleeve which serves as a play-free elastic element.

A further advantageous embodiment of the invention, shown in FIG. 3, is especially suitable for smaller rotary IR axes and for translatory IR-axes. Similar elements are indicated by the same reference numerals as used previously. This brake element is connected between the arm 6a and the shaft 5 in the same manner as in FIG. 2. Here, as a brake element, use is made of a known type of hydraulically actuated resilient sleeve 20.

In this case, the resilient sleeve 20 is loaded via its inside pressure chamber 21 with oil at high pressure. As with the axially operating brakes, control is effected by a suitable valve (not shown) similar to the one in the arrangement described previously. As a result of the oil pressure in the pressure chamber 21, the resilient sleeve 20 expands elastically, whereby its circumferential frictional face on its exterior sheath is applied to a facing friction surface belonging to the housing 22 so that a play-free friction-determined transmittal of high braking torque is possible. Use can be made of such a pressure-actuated resilient sleeve with both rotationally moving and translationally moving IR-members.

Finally, with respect to another embodiment as shown in FIG. 4, the housing 27 of a rotationally or translationally actuated IR-axis can be built partially as a resilient body 25. The elements 25 and 27 are firmly attached to each other, as for example, by means of screws 30. By forcing oil under high pressure into a gap between the friction faces of the resilient body 25 and the driven movable member 26, it is possible to eliminate the braking action between the elements 25 and 26. The dynamic seals 29 serve to seal-in the gap between the friction faces. In order to achieve a rapid pressure build-up, there is provided between the friction faces a helical-form of oil groove 28 which occupies up to about 50% of the friction area, the groove being loaded so rapidly with oil pressure that there is no need to wait a long time for the pressurized oil to penetrate into the friction gap. The special advantage of this solution, especially with smaller IR axes, resides in the fact that the brakes described here, with appropriately strong mechanical bracing and with an adequately strong, driven movable member 26, can be selectively and effectively controlled during braking by means of a pressure servo-valve (not shown). The servo-valve is of such a type well known in the prior art, which varies the hydraulic pressure so that the said brake can be operated as a locking brake in the absence of pressure, as a damping brake at light pressure or medium pressure and as a released brake, at relatively high pressure.

The IR's of the present invention preferably also have spring operated holding brakes, well known in the prior art, for holding the IR's to prevent movement of the arm elements caused by the force of gravity.

For certain applications of the IR, as for example, for tape-controlled milling, it is advantageous to leave unbraked only the IR axes which carry out the feed, and to lock the remaining IR axes so that higher cutting forces can be absorbed and transmitted by the IR. Consequently, the locking brakes are expediently made to be programmably controlled with respect to the axes.

The external forces which can be applied to the completely locked IR, as a rule, come from manufacturing units with their own feed, as is the case, for example, with drill-feed units, spot welders, for indirect spot-welding in 2-electrode designs, direct spot-welding with one electrode against a copper back-up bar, boring and riveting automatic equipment for aircraft construction and pressing cylinders for assembly. The majority of these applications first become possible by locking the IR.

As typical example, with a IR designed with 5 IR axes, the stiffness for a vertical force applied at a radial distance of 2600 mm was 1 mm/5000 Neutrons. Other radial distances and examples of stiffness force values will be apparent to one skilled in the art by using the principles of the invention.

The invention is not to be taken as limited to all of the details thereof, as modifications and variations thereof may be made without departing from the spirit or scope of the invention.

What is claimed is:

1. A multi-axis manipulating arm unit in the form of an articulated industrial robot arm having a high force generating means for generating a high force about one axis of said multi-axis unit;

said robot arm having a plurality of arm elements, at least two adjacent arm elements being disposed along different but connected longitudinal axes, said at least two arm elements being connected at a joint;

said joint having a drive system comprising an actuator for providing movement about an axis of said joint and a braking and locking arrangement, said braking and locking arrangement comprising:

first braking means comprising a device for stopping movement at said joint;

second braking means comprising a hydraulically operated brake for hydraulically applying braking force for braking and stopping said at least two arm elements about their corresponding joint;

said second braking means for applying force being substantially free of play about said joint when actuated for locking said at least two arm elements substantially rigidly with respect to one another such that forces are transmittable through said joint, which exceed many times the forces required to lock said plurality of arm elements substantially rigidly against the force of gravity and which exceed by many times the braking forces provided by said first braking means when said first braking means is actuated;

said first braking means and said second braking means both including means for permitting said adjacent arm elements to move substantially freely relative to each other when the braking force of both said brake means is deactuated;

said first braking means having portions;

said second braking means having portions;

said first braking means being disposed at said joint;

some of said portions of said first braking means being disposed on and directly attached to one of said adjacent arm elements, and some of said portions of said first braking means being disposed on and directly attached to the other of said adjacent arm elements to act directly upon said portions of said one of said adjacent arm elements;

said second braking means being disposed at said joint and a first of said portions of said second braking means being disposed on and directly attached to one of said arm elements for rotating with one of said adjacent arm elements, and a second of said portions of said second braking means being disposed on and directly attached to the other of said adjacent arm elements to act directly upon said portions of said one of said adjacent arm elements;

said means of said second braking means for permitting said adjacent arms to move substantially freely comprising flexible means;

said second braking means having at least a first braking surface means and at least a second braking surface means;

said flexible means having said first braking surface means attached thereto, said flexible means being firmly attached to said first of said portions of said second braking means;

said second braking surface means being disposed on and firmly attached to said second of said portions of said second braking means;

said flexible means for making braking contact and withdrawing braking contact between said first braking surface means and said second braking surface means;

actuator means for actuating and deactuating said flexible means by flexing said flexible means to make braking contact and withdrawing said braking contact between said first braking surface means and said second braking surface means;

said flexible means being flexible in one direction to make said braking contact and withdrawing said braking contact and being substantially rigid in a direction other than said one direction;

said flexible means being disposed such that said rigid direction is disposed in a direction of rotation of said adjacent arm elements, whereby there is no substantial play between said first and said second of said portions of said second braking means when said second braking means is actuated and also whereby, there is no substantial play between said adjacent arm elements when said second braking means is actuated;

said flexible means of said second braking means includes a brake piston made in the form of a circular braking element, having an axially elastic but rotationally stiff portion and said first braking surface means with a friction surface disposed thereon;

said actuator means comprising a hydraulic volume adjacent said brake piston for admitting hydraulic oil under pressure to flex said elastic portion and move said friction surface means thereon; and said second braking surface means having a friction surface and being disposed on a disc element adjacent said circular braking element;

said second braking surface means comprising an annular element having a friction surface adjacent a side of said disc element opposite said brake piston;

said annular element being connected to rotate with said brake piston;

said disc element being axially elastic but rotationally stiff so that a pressure from said brake piston urges another friction surface of said disc element against said friction surface of said annular element;

said friction surface of said brake piston being disposed to transmit a frictional torque, without substantial play, to said adjacent disc element which is freely rotatable relative to said friction surfaces when the second braking means is not actuated;

said friction surfaces of said braking surface means of said brake piston and said disc element are full circumferential ringshaped braking surfaces;

said multi-axis manipulating arm unit comprising a plurality of joints and a plurality of drive systems, at least some of said joints being rotary joints.

2. The multi-axis manipulating arm unit in accordance with claim 1, wherein said actuator includes a motor with a housing and wherein the flexible means comprises a resilient body which is operatively attached to a part of the motor housing.

3. The multi-axis manipulating arm unit in accordance with claim 1, including control means having means for ending a crawl-speed path movement on reaching a required position, to activate said first braking means, said crawl-speed movement and any overswinging resulting from the stiffness of the arm in use is minimized.

4. The multi-axis manipulating arm unit in accordance with claim 1, including control means having means for drawing up the second braking means during positioning, to increase the frictional damping already present.

5. The multi-axis manipulating arm unit in accordance with claim 4, wherein the control means includes means for activating said second braking means in proportion to the speed movement of a drive system.

6. The multi-axis manipulating arm unit in accordance with claim 1, wherein certain rotary joints are provided with a double shaft-end and two-sided power take-off, and including a plurality of first braking means and a plurality of second braking means wherein one of the first braking means of said plurality of first braking means and one of the second braking means of said plurality of said second braking means are arranged to lie symmetrically on each end of at least a predetermined one of said certain rotary joints.

7. The multi-axis manipulating arm unit in accordance with claim 1, wherein said drive systems associated with said plurality of joints are each provided with said first braking means which comprises a hydraulically released spring operated brake.

8. The multi-axis manipulating arm unit in accordance with claim 7, wherein said spring operated holding brakes include means to activate the braking action of said spring operated brake upon a loss of hydraulic pressure.

9. The multi-axis manipulating arm unit in accordance with claim 1, wherein each second braking means of each of the rotary joints is provided with more than one braking disc and thus has more than two friction faces.

10. The multi-axis manipulating arm unit in accordance with claim 2, including control means having means for ending a crawl-speed path movement on reaching a required position, to activate said first braking means, said crawl-speed movement and any overswinging resulting from the stiffness of the arm in use is minimized.

11. The multi-axis manipulating arm unit in accordance with claim 10, wherein said control means has means for drawing up the second braking means during positioning, to increase the frictional damping already present.

12. The multi-axis manipulating arm unit in accordance with claim 11, wherein the control means includes means for activating said second braking means in proportion to the speed of movement of a drive system.

13. The multi-axis manipulating arm unit in accordance with claim 11, wherein certain rotary joints are provided with a double shaft-end and two-sided power take-off, and including a plurality of first braking means and a plurality of second braking means wherein one of the first braking means of said plurality of first braking means and one of the second braking means of said plurality of said second braking means are arranged to lie symmetrically on each end of at least a predetermined one of said certain rotary joints.

14. The multi-axis manipulating arm unit in accordance with claim 13, wherein said drive systems associated with said plurality of joints are each provided with said first braking means which comprises a hydraulically released spring operated brake.

15. The multi-axis manipulating arm unit in accordance with claim 14, wherein said spring operated holding brakes include means to activate the braking action of said spring operated brake upon a loss of hydraulic pressure.

16. The multi-axis manipulating arm unit in accordance with claim 15, wherein each second braking means of each of the rotary joints is provided with more than one braking disc and thus has more than two friction faces.

* * * * *